United States Patent
Holtrop

[11] 3,982,506
[45] Sept. 28, 1976

[54] STRATIFIED CHARGE INTERNAL COMBUSTION ENGINE

[76] Inventor: John W. Holtrop, Rte. 1 Box 2052, Ridgecrest, Calif. 93555

[22] Filed: Apr. 28, 1975

[21] Appl. No.: 572,478

[52] U.S. Cl. ............... 123/75 B; 123/32 SP; 123/32 ST; 123/191 S; 123/191 SP
[51] Int. Cl.² ............ F02B 19/16; F02B 17/00
[58] Field of Search ......... 123/32 C, 32 D, 32 ST, 123/32 SP, 32 SA, 33 D, 33 R, 33 YC, 75 B, 79 R, 79 C, 188 AF, 188 VA, 191 S, 191 SP

[56] References Cited
UNITED STATES PATENTS

| | | | |
|---|---|---|---|
| 1,468,465 | 9/1923 | Erickson | 123/33 D |
| 1,953,793 | 4/1934 | Wurtele | 123/33 D X |
| 2,011,993 | 8/1935 | Aseltine | 123/75 B |
| 2,072,437 | 3/1937 | Wurtele | 123/33 D X |
| 2,179,278 | 11/1939 | Wurtele | 123/33 D X |
| 3,404,665 | 10/1968 | Barnett et al. | 123/32 SP X |

FOREIGN PATENTS OR APPLICATIONS

| | | | |
|---|---|---|---|
| 78,561 | 10/1919 | Austria | 123/79 R |

*Primary Examiner*—Charles J. Myhre
*Assistant Examiner*—Tony M. Argenbright
*Attorney, Agent, or Firm*—R. S. Sciascia; Roy Miller; Gerald F. Baker

[57] ABSTRACT

A stratified charge internal combustion engine combines a regular intake valve, a rich intake valve, a precombustion chamber and the sparkplug into a single coaxial unit. The coaxial configuration provides ideal flow symmetry, insures quick complete ignition of the combustion and main chambers and permits optimized control of exhaust emissions without lowering engine efficiency.

3 Claims, 1 Drawing Figure

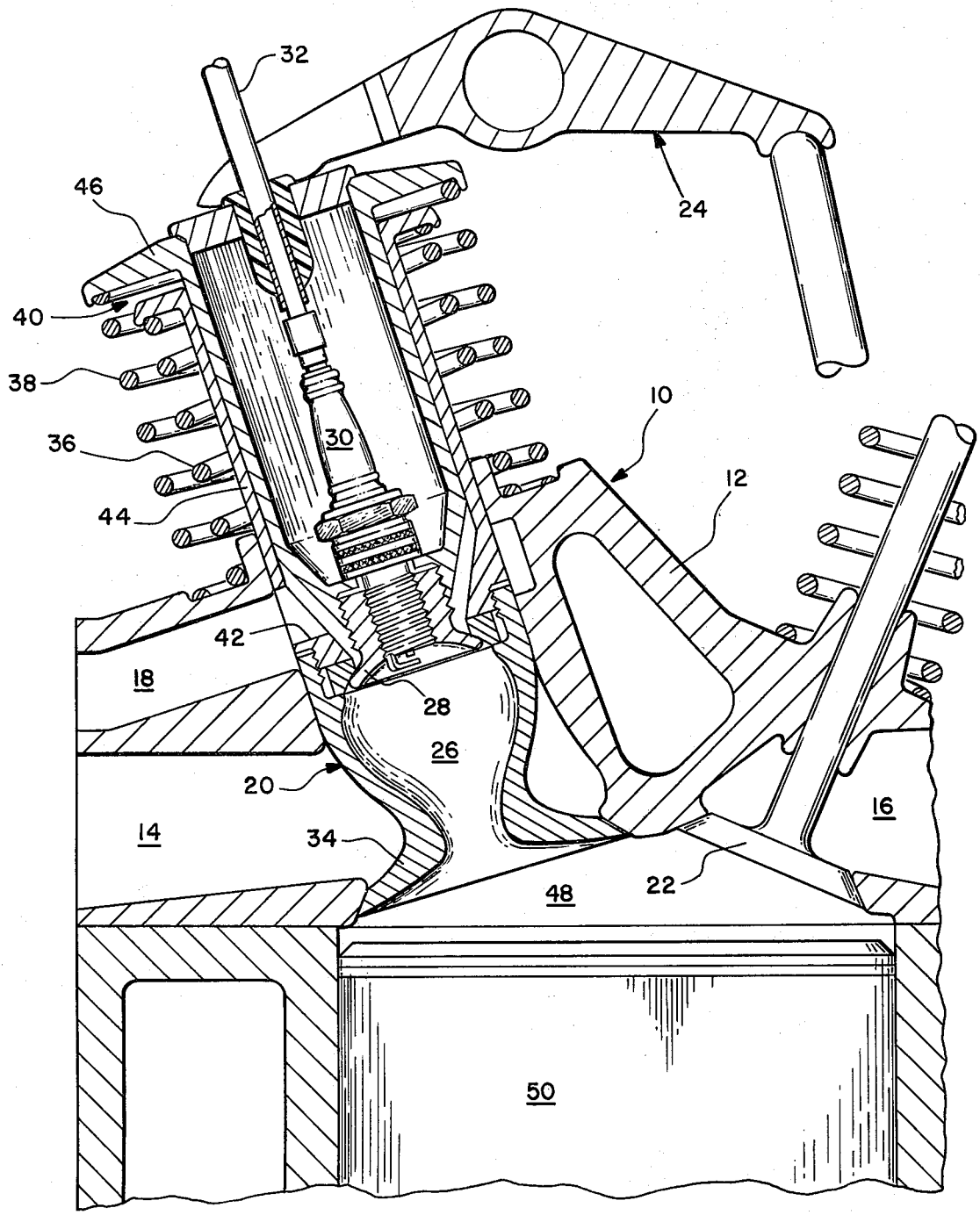

STRATIFIED CHARGE INTERNAL COMBUSTION ENGINE

GOVERNMENT INTEREST

The invention described herein may be manufactured and used by or for the Government of the United States of America for Governmental purposes without the payment of any royalties thereon or therefor.

BACKGROUND OF THE INVENTION

The present invention relates to a method for operating a spark ignition engine at extremely lean air to fuel ratios. Such lean air to fuel ratios are beneficial and desirable not only because they are more economical but also because the total combustion involved results in clean exhaust and greater engine efficiency.

Lean mixtures are commonly used in diesel engines and other continuous burning cycles. However, the spark ignition cycle has a tendency to misfire with a lean mixture. This happens because the excess air present cools and finally extinguishes the flame front. One successful method used to eliminate this tendency to misfire is the creation of a rich zone at the sparkplug. This allows the flame front to develop sufficient energy to maintain combustion throughout the lean charge. To accomplish this, a combustion chamber may be branched off the main chamber and fitted with an intake valve and sparkplug. In such an arrangement a special carburetor provides a rich mixture to the pre-combustion chamber allowing a reliable ignition and subsequent burning of the main lean charge.

The design of engines previously proposed using these features, however, have been very complex, requiring a number of additional components which must be crowded into a combustion area. As a result, the flow paths, pre-combustion chamber geometry, and sparkplug placement were all suboptimal. Accordingly, the results have shown a marked decrease in engine efficiency with increased manufacturing cost.

According to the present invention, an arrangement combining the regular intake valve, a rich intake valve, a pre-combustion chamber, and sparkplug into a single coaxial unit solves the packaging problem encountered with previous designs. Valve actuation is virtually unchanged. While the cylinder head gains an additional flow port, the sparkplug boss is eliminated. The coaxial design is compact and easily manufactured. The designer, therefore, can change important variables such as pre-combustion chamber geometry, distance from main charge and flow areas as desired. All of the pieces may be totally machined which allows more control over surface finish, charge flow, burning rate and heat transfer characteristics. These important variables can be optimized to control emissions without lowering engine efficiency. The coaxial configuration provides ideal flow symmetry and this insures quick, complete ignition of the pre-combustion and main charges.

BRIEF DESCRIPTION OF THE DRAWING

The single FIGURE of the drawing is a partial cross-sectional view of an engine incorporating the present invention.

DESCRIPTION AND OPERATION

A partial view of an internal combustion engine embodying the present invention is indicated by the numeral 10 on the drawing. The cylinder head 12 contains the familiar intake and exhaust ports 14, 16 respectively and, according to the present invention also includes a rich port 18.

The intake valve assembly 20 and the exhaust valve 22 are operated by a conventional rocker-arm system 24. Included within the intake valve assembly 20 are a pre-combustion chamber 26, a rick intake valve 28 and a sparkplug 30 with its ignition electrode 32.

Both the regular intake valve 34 and the rich intake valve 28 are held closed by standard valve springs 36, 38 respectively. The valve 34 opens after the valve 28 has moved a predetermined distance determined by the clearance between the respective valve bodies at 40.

Two carburetion devices or other fuel feeding means are contemplated in the utilization of this device. Thus, a rich fuel mixture is fed to the rich port 18 and a regular or lean mixture is fed to the other intake port 14.

As the intake stroke begins, the rocker-arm causes the rich intake valve 28 to open and a rich mixture begins to flow into the combustion chamber 26 by way of one or more transfer ports 42 in the intake valve body 44. As the rocker-arm 24 continues to move, the clearance at 40 is taken up and the valve body 46 contacts the valve body 44 causing movement of the regular intake valve 34 to allow the lean mixture from port 14 to fill the engine cylinder chamber 48 above piston 50 as the piston travels downward on the intake stroke. When the intake cycle is complete, the rocker-arm returns, and both intake valves close. The compression, power, and exhaust cycles are standard.

The combining of the regular intake valve with a rich intake valve, a pre-combustion chamber and a sparkplug in a single coaxial unit solves the space and packaging problems usually encountered with other designs heretofore suggested. The valve actuation may be practically unchanged. Although the cylinder head must have an additional fuel port, the sparkplug boss is eliminated. The coaxial design is, therefore, compact and easily manufactured.

This construction allows the designer to change the important features such as pre-combustion chamber geometry, distance from main charge and details of flow areas.

This arrangement also lends itself to ordinary machining of parts allowing control over surface finishes giving better fuel flow, burning rate and heat transfer characteristics.

Since the important variables can be optimized in engine construction, greater engine efficiency may be achieved with a minimum of environmental pollution by exhaust emmission.

The coaxial configuration of the intake system provides ideal flow symmetry insuring quick, complete ignition of the pre-combustion and main charges. Since the tubular valve stems are larger in diameter and, thus, much stiffer than conventional valve stems, lightweight materials may be utilized in the low temperature areas with only the high temperature areas being formed of traditional materials with a consequent reduction in weight per horsepower.

What is claimed is:

1. In an internal combustion reciprocating engine including a cylinder having a bore extending therethrough, a cylinder head having a substantially flat surface closing one end of the cylinder bore and a piston reciprocating in the cylinder bore, the improvement comprising:

a fuel intake and ignition system combination including;
- A. first and second intake ports in said cylinder head,
- B. first and second valve means in said cylinder head normally closing said ports from communication to said cylinder bore,
- C. each of said valve means being formed by hollow tubes coaxially arranged in said cylinder head for reciprocating sliding action with respect to each other and said cylinder head,
- D. said first valve means cooperating with said first port to admit a lean air-fuel mixture to said cylinder bore and having formed therein a rich mixture combustion chamber,
- E. said second valve means cooperating with said second port to admit a rich fuel mixture to said rich combustion chamber; and
- F. ignition electrode means coaxial with said second valve means and terminating adjacent said rich mixture chamber for igniting mixture therein;
- G. the time of opening of said valves and the ignition of said rich fuel mixture being regulated such that, at ignition, said rich fuel-air mixture exists substantially within said rich combustion chamber, said lean-air fuel mixture exists in said cylinder bore and combustion initiated in said rich fuel mixture flows into said cylinder bore to ignite said lean fuel-air mixture therein.

2. The engine of claim 1 further comprising:
said ignition electrode means being removably fastened within said second valve means; and
said second valve means including sufficient access means to allow maintenance of said ignition electrode means.

3. The engine of claim 1 wherein said ignition electrode means is a conventional spark plug threadedly received in said second valve means and access is provided in said valve means for maintenance of said spark plug.

* * * * *